(12) United States Patent
Meier et al.

(10) Patent No.: US 10,768,604 B2
(45) Date of Patent: Sep. 8, 2020

(54) METHOD FOR USING A GEOMETRICAL PROBE WITH A SPINDLE OF A MACHINE TOOL, AND MACHINE TOOL CONFIGURED TO CARRY OUT SUCH A METHOD

(71) Applicant: Mikron Agie Charmilles AG, Nidau (CH)

(72) Inventors: Jonas Meier, Bern (CH); Jean-Philippe Besuchet, Neuchatel (CH); Kurt Schneider, Ipsach (CH)

(73) Assignee: GF MACHINING SOLUTIONS AG (CH)

( * ) Notice: Subject to any disclaimer, the term of this patent is extended or adjusted under 35 U.S.C. 154(b) by 59 days.

(21) Appl. No.: 16/101,884

(22) Filed: Aug. 13, 2018

(65) Prior Publication Data

US 2019/0056711 A1 Feb. 21, 2019

(30) Foreign Application Priority Data

Aug. 15, 2017 (EP) .................................... 17186241

(51) Int. Cl.
| | | |
|---|---|---|
| *G05B 19/404* | (2006.01) | |
| *G05B 19/4065* | (2006.01) | |
| *B23Q 17/09* | (2006.01) | |
| *G01B 11/00* | (2006.01) | |
| *G05B 19/406* | (2006.01) | |

(52) U.S. Cl.
CPC ....... *G05B 19/404* (2013.01); *B23Q 17/0985* (2013.01); *G01B 11/007* (2013.01); *G05B 19/406* (2013.01); *G05B 19/4065* (2013.01); *B23Q 2717/006* (2013.01); *G05B 2219/37001* (2013.01); *G05B 2219/37008* (2013.01); *G05B 2219/37027* (2013.01); *G05B 2219/37043* (2013.01); *G05B 2219/37428* (2013.01)

(58) Field of Classification Search
CPC ..................................................... G05B 19/404
See application file for complete search history.

(56) References Cited

U.S. PATENT DOCUMENTS

| | | | |
|---|---|---|---|
| 10,030,960 B2 | 7/2018 | Besuchet et al. | |
| 10,042,922 B2 | 8/2018 | Besuchet et al. | |
| 2003/0088972 A1* | 5/2003 | Haimer | B23B 31/028 29/700 |

(Continued)

FOREIGN PATENT DOCUMENTS

| | | |
|---|---|---|
| DE | 10-2007-021140 A1 | 11/2008 |
| EP | 0 458 499 A2 | 11/1991 |
| EP | 2 058 085 A1 | 5/2009 |

OTHER PUBLICATIONS

Extended European Search Report for Application No. EP 17 18 6241 dated Feb. 26, 2018 (7 pages).

*Primary Examiner* — Mark A Connolly
(74) *Attorney, Agent, or Firm* — Harness, Dickey & Pierce, P.L.C.

(57) ABSTRACT

A method for using a geometrical probe (5) with a spindle (3) of a machine tool (1), wherein a probe fetch waiting state of the machine tool (1), at least one temperature parameter related to a temperature of the spindle (3) of the machine tool (1) is determined by measuring at least one temperature value for the spindle (3), and time for fetching the geometrical probe (5) is determined depending on the at least one temperature parameter.

14 Claims, 2 Drawing Sheets

(56) References Cited

U.S. PATENT DOCUMENTS

2010/0132207 A1* 6/2010 Mamour ................ G01B 5/012
33/503
2014/0211828 A1* 7/2014 Moersch ................ G01B 21/04
374/142
2018/0150049 A1   5/2018 Schranz et al.

* cited by examiner

METHOD FOR USING A GEOMETRICAL PROBE WITH A SPINDLE OF A MACHINE TOOL, AND MACHINE TOOL CONFIGURED TO CARRY OUT SUCH A METHOD

CROSS REFERENCE TO RELATED APPLICATION

This application claims the benefit and priority of European Patent Application No. 17 186 241.0, filed Aug. 15, 2017. The entire disclosure of the above application is incorporated herein by reference.

BACKGROUND

Technical Field

The invention is related to a method for using a geometrical probe with a spindle of a machine tool, and a machine tool configured to carry out such a method.

On machine tools, in particular, e.g. a milling machine, an exact reference position of a part to be machined is typically measured using a geometrical probe, such as a touch probe. The geometrical probe is mounted into a spindle of the machine tool and used to measure at least one position with respect to the part to be machined while the spindle is in a non-rotating state. The geometrical probe may be exchanged against machining tools such as e.g. a miller, a drill bit, a reamer, or any other appropriate tool configured to machine a workpiece, i.e. a part to be machined. In order to machine the workpiece, such a tool is mounted into the spindle, and the spindle is rotated about a spindle axis. During rotation of the spindle, heat generated by spindle bearings and/or a spindle motor is spread to a spindle shaft as well as to the rest of the machine tool connected to the spindle. This heat transfer generates mainly an expansion of the spindle shaft length as well as a deformation of the machine structure leading to a possible displacement of a tip of the tool mounted into the spindle in at least one direction, typically in all directions. To reduce the non-productive time of the production, a machine tool user needs to use the geometrical probe as fast as possible after a machining operation. However, if the touch probe is picked up right after a rotation of the spindle, the temperature difference between the warm spindle shaft and the geometrical probe generates heat transfer. This leads to a transient thermal behavior of the spindle-probe assembly modifying the position of the geometrical probe, in particular a probe end tip of the geometrical probe, wherein this modification might induce errors in the referencing of the workpiece. A possibility to obviate this problem would be to implement a sufficiently long waiting time before or after mounting the geometrical probe. However, defining such a conservative waiting time which is long enough for all practical purposes might well be too long for most instances, thus leading to unnecessary costly non-productive downtime. The geometrical probe could also be calibrated for specific thermal conditions. However, it is not necessarily so that the thermal condition of the spindle might always match the thermal conditions for which the geometrical probe was calibrated. In fact, this cannot be guaranteed for most instances. Thermal modelling, taking into account a history of the spindle activity and/or the spindle shaft, is cumbersome and leads to imprecise results.

SUMMARY OF INVENTION

It is therefore an aspect of the invention to provide a method for using a geometrical probe with a spindle of a machine tool as well as a machine tool configured to carry out such a method, wherein the above-mentioned problems do not occur.

In particular, a method for using a geometrical probe with the spindle of a machine tool is provided, wherein, in a probe fetch waiting state, at least one temperature parameter related to a temperature of the spindle of the machine tool is determined by measuring at least one temperature value of the spindle, and a time for fetching the geometrical probe is determined depending on the at least one temperature parameter. In this way, a thermal state of the spindle can be retrieved through temperature measurement, such that precise information about the thermal state of the spindle is available. From that, the time when the geometrical probe may safely be fetched can be determined in an accurate, reproducible, precise and convenient way. Since the time for fetching the geometrical probe is determined based on the actual temperature measured at the spindle, it is not necessary to choose a longer waiting time than it is needed for a precise usage of the geometrical probe. Thus, costly downtime of the machine tool is avoided. The time for fetching the geometrical probe can be determined for any temperature of the spindle after any kind of activity or work done by the same, independent of any calibration data points for the geometrical probe or the assembly of the spindle and the geometrical probe. The method does not need complicated or cumbersome thermal modelling, or at least leads to precise and accurate results if such thermal modelling is used, because such modelling is based on the actual spindle temperature and not just on a guess about the thermal state of the spindle based on preceding machining activity.

A geometrical probe in particular is a probe being configured to measure geometrical properties of the machine tool and/or a workpiece to be machined by the machine tool, be it by physical contact, such as with a touch probe, or by any contactless or non-contact measuring method.

The machine tool preferably has a tool magazine, in which the geometrical probe is stored, preferably together with other tools, in particular machining tools like, e.g., a miller, a drill bit, a reamer, or any other appropriate machining tool. The different tools may be automatically fetched by the spindle, or taken and mounted to the spindle by a tool changing device, such as a robot arm or any other appropriate device configured to change tools in the machine tool.

Fetching the geometrical probe and/or a machining tool in particular means coupling the geometrical probe and/or the machining tool with the spindle.

In particular, the geometrical probe is fetched at the time for fetching the geometrical probe, which is also called probe-fetching time.

At least one temperature value of the spindle being measured in particular means that a temperature value or a sequence of temperature values in time is measured at at least one location of the spindle and/or a stator housing the spindle, the at least one location preferably including a spindle bearing, in particular a spindle front bearing. Preferably, temperature values are measured at more than one location of the spindle, in particular at more than one bearing. Other locations for temperature measurement are also possible. The at least one spindle bearing may cause different amounts of heat, dependent on its design and function. The at least one bearing may preferably be configured as a mechanical bearing, like a roller or ball bearing, or as an air bearing, or as a magnetic bearing, or a bearing having magnetic oil drains. Bearings which avoid mechanical contact between the rotor part and the stator part, like air bearings or magnetic bearings, generate considerably less heat than mechanical bearings. Thus, in particular for these bearings the at least one location for temperature measurement can be arranged in a distance to the bearing, and, preferably, closer to the spindle motor which then is considered to be a main heat source.

Additionally or alternatively, at least one temperature value of the spindle is measured in time. This means that according to one embodiment, one or several temperature values may be measured at a single specified point in time, the several temperature values being measured at different locations of the spindle. According to another embodiment, a sequence of temperature values is measured through time, i.e. at different points in time, wherein the temperature values can be measured at a single location of the spindle, or wherein—preferably at each point in time when a temperature is measured—a plurality of temperature values can be measured at different locations of the spindle.

According to an embodiment of the invention, the at least one temperature parameter is chosen from a group consisting of the at least one temperature value itself, and a time derivative of a measured spindle temperature, in particular a time derivative of a plurality of temperature values or a sequence of temperature values measured through time at one spindle location or at a plurality of spindle locations. The probe-fetching time thus can be determined based on the at least one temperature value itself, or based on the time derivative. While determining the probe-fetching time based on the at least one temperature value itself makes the method very easy and allows for speedy processing, taking into account the derivative allows for a more precise and accurate determination of the probe-fetching time.

According to an embodiment of the invention, a start temperature value of the spindle is measured as the at least one temperature value, and a waiting time interval for the machine tool to wait prior to fetching the geometrical probe—starting from a start time when the start temperature value is measured—is determined depending on the start temperature value. This allows for most simple determination of the probe-fetching time, which is only determined based on the start temperature value and preferably a temperature model or a look-up table allowing to determine the waiting time interval depending on the measured start temperature value. Preferably, a signal to fetch the geometrical probe is produced after the waiting time interval has expired, such that the probe-fetching time is the time when the start temperature value is measured plus the waiting time interval.

According to an embodiment of the invention, a temporal sequence of temperature values of the spindle is measured as the at least one temperature value, and a signal to fetch the geometrical probe is produced when the temperature values remain constant within a predetermined relative temperature range for a predetermined time interval. Thus, the thermal state of the spindle is monitored perpetually, and the geometrical probe may be fetched when the spindle reaches its thermal equilibrium in the sense that the spindle temperature is constant within the predetermined relative temperature range at least for the predetermined time interval. A relative temperature range in particular means a temperature range given in terms of a percentage about the substantially constant temperature value. Observing whether the temperature values remain constant for a predetermined time interval makes sure that indeed thermal equilibrium is reached with a high degree of certainty.

Additionally or alternatively, a temporal sequence of temperature values of the spindle is measured, and a signal to fetch the geometrical probe is produced when the temperature values reach or fall below a predetermined probe fetch temperature limit. The signal to fetch the geometrical probe may be produced when a first temperature value of the temperature values reaches or falls below the predetermined probe fetch temperature limit, or, alternatively, when a predetermined number of consecutive temperature values reach or fall below the predetermined probe fetch temperature limit. The predetermined probe fetch temperature limit preferably is chosen such that thermal stability, preferably thermal equilibrium, of the spindle can be guaranteed or is at least approximately reached when the spindle temperature is at or below the predetermined probe fetch temperature limit.

Additionally or alternatively, a temporal sequence of temperature values of the spindle is measured as the at least one temperature value, and a signal to fetch the geometrical probe is produced when a time derivative of the temporal sequence of temperature values reaches or rises above a predetermined probe fetch derivative limit. The time derivative normally will be negative, because the spindle temperature falls between the first temperature measurement and the probe-fetching time. It will be readily appreciated that the—negative—time derivative will be low when the temperature falls with a high rate, wherein the derivative becomes higher and closer to Zero when the temperature values approach thermal equilibrium of the spindle. Thus, observing whether the time derivative reaches or rises above the predetermined probe fetch derivative limit is a very appropriate means for determining whether a stable thermal state, in particular thermal equilibrium, of the spindle is reached.

Additionally or in the alternative, a temporal sequence of temperature values of the spindle is measured as the at least one temperature value, and a signal to fetch the geometrical probe is produced after a predetermined maximum waiting time has elapsed, if none of the aforementioned conditions applies, i.e. the temperature values not remaining constant, the temperature values not reaching or falling below the predetermined probe fetch temperature limit, and/or the time derivative of the temporal sequence of temperature values not reaching or rising above the predetermined probe fetch derivative limit. In this case, excessively long waiting times can be avoided, which is as well meaningful as sensible in a case where errors in the temperature measurement or evaluation occur, e.g. because of defects of at least one temperature sensor. However, it might well be that in this case thermal equilibrium or a stable thermal state of the spindle may not be reached after the predetermined maximum waiting time.

Therefore, according to an embodiment of the invention, if the probe fetch signal, i.e. the signal to fetch the geometrical probe, is produced after the predetermined maximum waiting time has elapsed, and in particular because of the predetermined maximum waiting time has elapsed, a warning signal is produced. The warning signal will inform a user of the machine tool that the temperature measurement and/or a further processing of the temperature measurement has not resulted in a reasonable outcome, such that there is a risk that the spindle did not reach a stable thermal state or thermal equilibrium. Thus, a measurement using the geometrical probe may lead to imprecise results.

According to an embodiment of the invention, a temperature model of the spindle is used to determine at least one of the waiting time interval, the predetermined relative temperature range, the predetermined time interval, the predetermined probe fetch temperature limit, and the predetermined probe fetch derivative limit. Such a temperature model is readily available and only used within the method suggested here to decide at what point a temperature gradient between the spindle on the one hand and the geometrical probe on the other hand is insignificant enough for an accurate enough probing using the geometrical probe. Thus, the temperature model is based on real temperature measurements and leads to meaningful results.

According to an embodiment of the invention, on a pickup signal to change or pick up a tool, it is checked whether the pickup signal is a probe fetch request signal, and further, if the pickup signal is a probe fetch request signal, the machine tool is brought into the probe fetch waiting state. Thus, the method steps of any of the embodiment as explained above, in particular determining the at least one temperature parameter and further determining the probe-fetching time depending on the at least one temperature parameter, are started when a pickup signal, signaling that a tool for the spindle shall be changed or picked up, is identified to be a probe fetch request signal, i.e. a signal signaling that the geometrical probe shall be fetched. This on the one hand guarantees that the method steps as detailed above are applied prior to fetching the geometrical probe, wherein, on the other hand, it is guaranteed that the method steps are not carried out if another tool, not being a geometrical probe, shall be fetched, i.e. in the case that the pickup signal is not a probe fetch request signal. This avoids costly downtime of the machine tool and at the same time guarantees sufficient thermal equilibration of the spindle prior to fetching the geometrical probe.

According to an embodiment of the invention, a spindle temperature adjustment tool is mounted to the spindle in the probe fetch waiting state. A spindle temperature adjustment tool in particular is a tool which is configured to adjust the temperature of the spindle, in particular to cool the spindle, which in particular means that a cooling rate for the spindle may be increased or a certain temperature may be set and maintained by the temperature adjustment tool mounted to the spindle, in particular as compared with a cooling rate of the spindle when no temperature adjustment tool is mounted to the spindle. The spindle temperature adjustment tool is mounted to the spindle preferably depending on the at least one temperature parameter. In particular, the spindle temperature adjustment tool can be mounted to the spindle if the spindle temperature is higher than a predetermined adjustment tool temperature limit, or if the time derivative of the spindle temperature is lower than a predetermined adjustment tool derivative limit, in order to speedily decrease the spindle temperature, or to speed up decrease of the spindle temperature.

The spindle temperature adjustment tool may be at least one of a passive cooling tool and an active spindle temperature adjustment tool, a passive cooling tool in particular being a tool comprising a main body having a high specific heat capacity, in particular higher than 300 J/kg·° K, and/or a high thermal conductivity, in particular higher than 300 W/(m° K). In particular, the main body of the cooling tool may comprise copper or consist of copper.

An active spindle temperature adjustment tool in particular is a tool configured to and allowing for tempering or cooling of the spindle from inside, the spindle temperature adjustment tool in particular having a feedthrough for feeding a cooling medium, in particular a cooling fluid, into an inner space of the spindle. Preferably, the spindle temperature adjustment tool is configured as a tool-holder allowing for through-spindle temperature adjustment. In particular, the use of through-spindle temperature adjustment with the non-rotating spindle allows for a faster decrease of the spindle temperature.

The adjustment tool temperature limit is preferably higher than the probe fetch temperature limit.

According to an embodiment of the invention, a geometrical probe is fetched on a signal to fetch the geometrical probe, and a predetermined probe waiting time is waited from the fetching of the geometrical probe to a first usage of the geometrical probe. The predetermined probe waiting time preferably is chosen such that thermalisation of the assembly of the spindle on the one hand and the geometrical probe on the other hand is reached or approximately reached prior to any measurement done with the geometrical probe. In this way, proper thermal stability for accurate measurements using the geometrical probe can be ensured.

According to an embodiment of the invention, the machine tool is a milling machine. Additionally or alternatively, the geometrical probe preferably is a touch probe. In particular in these cases the advantages conferred by the method suggested herein are reached.

According to an embodiment of the invention, the time for fetching the geometrical probe is also, particularly in addition to its determination depending on the at least one temperature parameter—determined depending on at least one preset machine user parameter. Thus, a user using the machine tool may preferably influence the time for fetching the geometrical probe by setting the at least one machine user parameter according to his or her preferences. In particular, by choosing the at least one preset machine user parameter, the user may prolong or shorten the waiting time interval and/or the predetermined probe waiting time.

The time for fetching the geometrical probe is preferably automatically determined depending on the at least one preset machine user parameter. Thus, the user only has to choose or set the at least one machine user parameter, and the time for fetching the geometrical probe is then determined automatically without further user interaction.

According to an embodiment of the invention, the at least one machine user parameter is selected from a group consisting of a preset machining accuracy, a preset machining speed, and a preset surface quality of a surface of a workpiece, the surface quality being reached by machining the surface of the workpiece with the machine tool. Insofar, these different machine user parameters are at least to some extent contradictory. E.g., a high machining speed may be detrimental for a high machining accuracy, and vice versa. Further, if for example the machining speed shall be high and the machining accuracy may be reduced, the waiting time interval or the predetermined probe waiting time may be shortened. Otherwise, if the machining accuracy and/or the surface quality shall be high, a larger waiting time interval and/or probe waiting time, or a later time for fetching the geometrical probe may be chosen.

According to an embodiment of the invention, the time for fetching the geometrical probe is determined by determining at least one fetching time parameter, the at least one fetching time parameter being determined depending on the at least one machine user parameter. The at least one fetching time parameter is selected from a group consisting of a variable time and/or a variable temperature threshold, a variable delay, the waiting time interval, the predetermined relative temperature range, the predetermined time interval, the predetermined probe fetch temperature limit, the predetermined probe fetch derivative limit, the predetermined maximum waiting time, and the predetermined probe waiting time. All these fetching time parameters have influence on the time for fetching the geometrical probe. Thus, each of these parameters may be used as a fetching time parameter to determine the time for fetching the geometrical probe.

Certain aspects of the invention are also achieved by providing a machine tool, the machine tool having a spindle, a geometrical probe adapted to be—in particular automatically—coupled to the spindle, at least one temperature sensor arranged and configured to measure a spindle temperature value of the spindle, and a control device, the control device being configured to carry out a method according to any of the aforementioned embodiments. In particular, the machine tool confers the advantages as already described with respect to the method.

As already mentioned, the machine tool preferably has a tool magazine, different tools and in particular the geometrical probe being stored in the tool magazine for subsequent coupling to the spindle.

The machine tool preferably is a milling machine. Additionally or alternatively, the geometrical probe is a touch probe.

The machine tool preferably has a tool change device for automatically changing tools, and in particular for coupling different tools to the spindle.

BRIEF DESCRIPTION OF THE DRAWINGS

The invention is further explained with reference to the drawing, wherein.

DETAILED DESCRIPTION OF THE PREFERRED EMBODIMENTS

Figure 1:
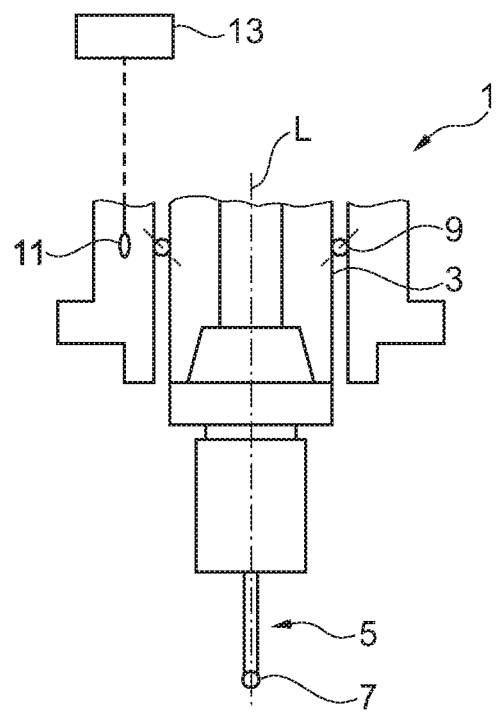
FIG. 1 shows a schematic representation of an embodiment of a machine tool having a geometrical probe coupled to its spindle.

FIG. 1 shows a schematic representation of an embodiment of a machine tool 1, the machine tool 1 having a spindle 3, and a geometrical probe 5 which is configured to be—preferably automatically—coupled to the spindle 3 for position measurement in particular at a surface of a workpiece to be machined with the machine tool 1. The geometrical probe 5 is preferably configured as a touch probe, as schematically shown in FIG. 1, and thus configured to measure positions at the workpiece by contacting the workpiece surface with a probe end tip 7. Additionally or alternatively, the machine tool 1 is preferably configured as a milling machine.

Typically, when the geometrical probe 5 is attached to the spindle 3 and used for position measurement at a workpiece, the spindle 3 is in a non-rotating state. The machine tool 1 preferably has a tool magazine comprising at least one machining tool or a plurality of machining tools for machining a workpiece, wherein the at least one machining tool and the geometrical probe 5 can be—preferably automatically—exchanged against each other. When the spindle 3 is used for machining the workpiece with a machining tool, e.g. a miller, a drill bit, a reamer, or another appropriate machining tool, the spindle 3 is in a rotating state. During the machining operation, the spindle 3 heats up, in particular due to heat generated in at least one spindle bearing 9 and/or a spindle motor not shown in FIG. 1, and further by the heat generated in a contact area of the machining tool and the workpiece. This generated heat causes at least an expansion of a spindle shaft length as measured along a length axis L of the spindle 3, typically a deformation of the complete spindle 3 in more than one direction, typically in all directions, which afterwards, when the geometrical probe 5 is mounted into the spindle 3 directly after the machining operation, results in a displacement of the probe end tip 7 in at least one direction, typically in all directions. In order to avoid this problem, the spindle 3 should be allowed to cool down into a thermally stable state prior to fetching the geometrical probe 5 and in particular prior to using the geometrical probe 5 for position measurement. This introduces non-productive downtime for a user of the machine tool 1, such that it is desirable to reduce a waiting time prior to fetching the geometrical probe 5 as much as possible.

In order to achieve this objective, the machine tool 1 has at least one temperature sensor 11 which is arranged and configured to measure a spindle temperature value. In the embodiment schematically shown in FIG. 1, the temperature sensor 11 is located in the region of the spindle bearing 9, which in particular is a spindle front bearing, which particularly corresponds to a heat spot of the spindle 3, in particular if the bearing is a mechanical bearing, particularly a roller bearing or a ball bearing. The temperature sensor 11 may be located in a distance to the bearing 9, and in particular closer to the spindle motor, if the bearing 9 is a non-contact bearing like a magnetic bearing or an air bearing. In the embodiment shown, the temperature sensor 11 is arranged in a stator housing the spindle 3. Further, the temperature sensor 11 or a further temperature sensor may preferably be located in the spindle 3 itself, in particular in the spindle shaft. The temperature sensor 11 is operatively connected to a control device 13, the control device 13 being configured to carry out a method as further detailed below.

In particular, the control device 13 is configured to determine, in a probe fetch waiting state, by measuring at least one temperature value of the spindle 3 using the at least one temperature sensor 11, at least one temperature parameter related to a temperature of the spindle 3, and further to determine a time for fetching the geometrical probe 5 depending on the at least one so determined temperature parameter. The machine tool 1, and in particular the control device 13, is further configured to fetch the geometrical probe 5 at the so determined probe-fetching time.

In particular, on a pickup signal, signaling that a tool shall be changed or picked up and thus mounted into the spindle 3, the control device 13 checks whether the pickup signal is a probe fetch request signal, signaling that the geometrical probe 5 shall be mounted into the spindle 3. Further, if the pickup signal is indeed a probe fetch request signal, the control device 13 is configured to bring the machine tool 1 into the probe fetch waiting state, thus carrying out the steps of determining the at least one temperature parameter and further determining the probe-fetching time depending on the at least one temperature parameter, as well as further fetching the geometrical probe 5 only at the probe-fetching time so determined.

Preferably, when the geometrical probe 5 is fetched on a probe fetch signal signaling that the geometrical probe 5 shall be fetched, the control device 13 is configured to wait a predetermined probe waiting time from the very moment when the geometrical probe 5 is mounted to the spindle 3 until a first usage of the geometrical probe 5. This ensures a proper thermalisation of the spindle 3 and the geometrical probe 5 in the preferably thermally stable state of the spindle 3 reached before, for guaranteeing exact, precise and accurate measurement results for position measurement using the geometrical probe 5.

The at least one temperature parameter is preferably chosen from a group consisting of the at least one temperature value itself, and a time derivative of a measured spindle temperature, i.e. a time derivative of a plurality of temperature values measured through time.

Figure 2:
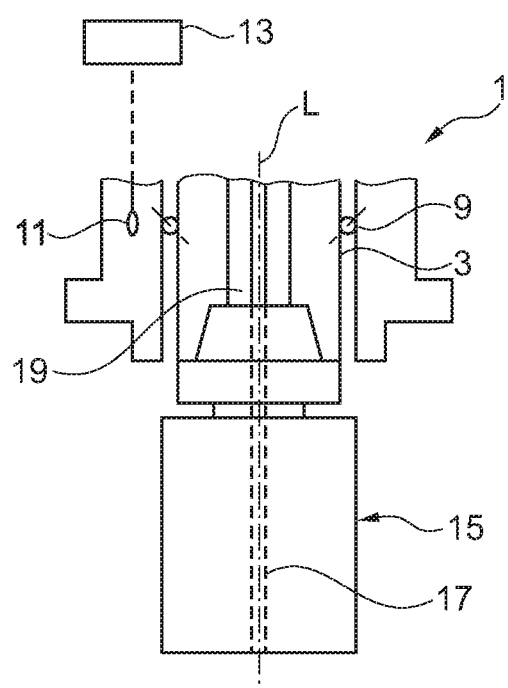
FIG. 2 shows a schematic representation of the embodiment of the machine tool according to FIG. 1, having a spindle temperature adjustment tool coupled to the spindle.

FIG. 2 shows a schematic representation of the embodiment of the machine tool 1 according to FIG. 1, having a spindle temperature adjustment tool 15 mounted to the spindle 3. Thus, the spindle temperature adjustment tool 15 is exchanged against the geometrical probe 5. Identical or functionally equivalent elements are denoted with same reference numerals, such that insofar reference is made to the description given above. The spindle temperature adjustment tool 15 is preferably mounted to the spindle 3 in the probe fetch waiting state depending on the at least one temperature parameter. In particular, the spindle temperature adjustment tool 15 may be mounted to the spindle 3 if the temperature value measured by the temperature sensor 11, in particular a first, initial temperature value, is higher than a predetermined adjustment tool temperature limit, and/or if a time derivative of a sequence of the temperature values measured by the temperature sensor 11 is lower than a predetermined adjustment tool derivative limit. A time needed for the spindle 3 to cool down can be reduced by mounting the spindle temperature adjustment tool 15 into the spindle 3, or the spindle 3 may be thermalized, i. e. brought to and/or maintained at a certain temperature, by the spindle temperature adjustment tool 15.

The spindle temperature adjustment tool 15 shown in FIG. 2 is an active temperature adjustment tool, allowing for through-spindle temperature adjustment, in particular for through-spindle cooling. To this effect, the spindle temperature adjustment tool 15 has a through-bore 17 being fluidically connected to an interior space 19, such that a cooling fluid may be introduced via the spindle temperature adjustment tool 15 through the through-bore 17 into the interior space 19 of the spindle 3 in order to accelerate down-cooling and/or thermalization of the spindle 3.

Additionally or alternatively, the spindle temperature adjustment tool 15 is configured as a passive cooling tool, which preferably is configured as a massive part, in particular having a specific heat capacity of more than 300 J/kg° K and/or a thermal conductivity exceeding 300 W/(m° K). The spindle temperature adjustment tool 15 may comprise copper or preferably consist of copper. In particular, the spindle temperature adjustment tool 15 may have a massive main body consisting of copper or another appropriate material in terms of an appropriate specific heat capacity and/or an appropriate thermal conductivity.

The spindle temperature adjustment tool 15 can be configured to combine the properties of an active temperature adjustment tool and a passive cooling tool, thus having both a high specific heat capacity and a high thermal conductivity, and further allowing for through-spindle temperature adjustment, in particular by having a respective through-bore 17 which can be brought in fluidic connection to the interior space 19 of the spindle 3.

The spindle 3 is preferably in a non-rotating state, when the spindle temperature adjustment tool 15 is coupled to the spindle 3.

Figure 3:
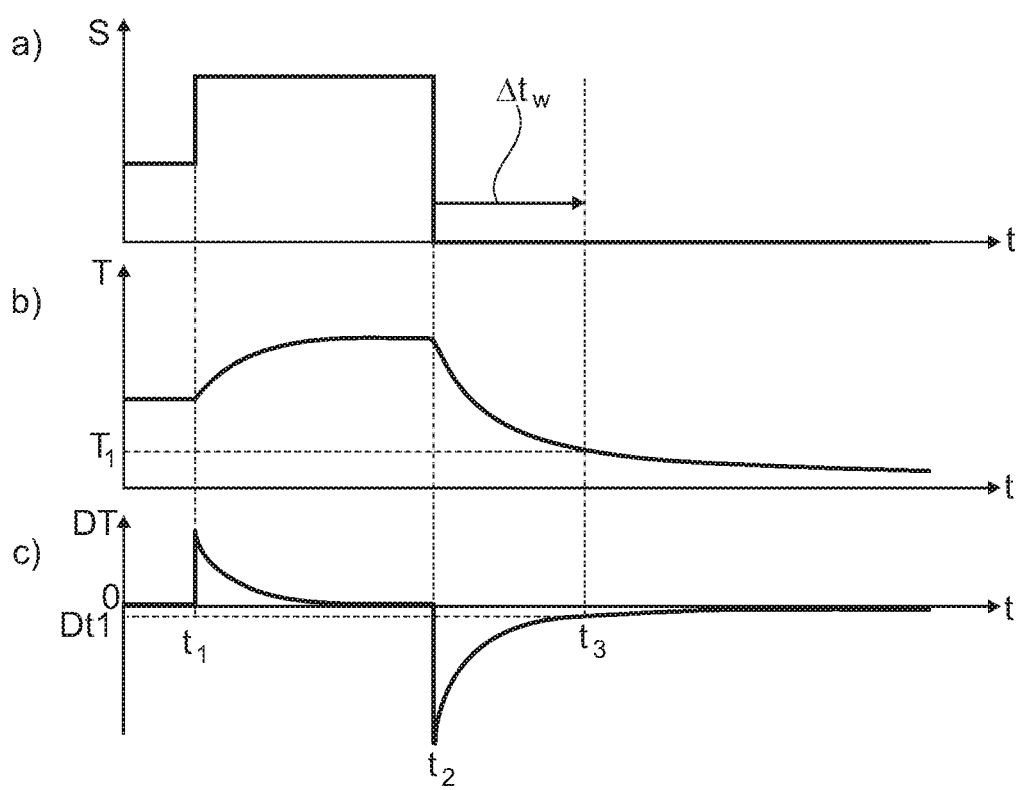
FIG. 3 shows a schematic representation of embodiments of a method for using a geometrical probe with a spindle of a machine tool.

FIG. 3 shows a schematic representation of different embodiments of a method for using the geometrical probe 5 with the spindle 3 of the machine tool 1. A first diagram at a) shows a spindle activity signal S plotted against time t, wherein at a first point in time $t_1$ the spindle 3 starts a machining operation using a machining tool, like, e.g. a miller, a drill bit, a reamer, or another appropriate machining tool, to machine a workpiece. As shown at b) and c), a temperature T of the spindle 3, preferably measured by the temperature sensor 11, increases during the machining operation, thus the spindle 3 heats up due to heat generated in the rotating machining state of the spindle 3. At b) the temperature T of the spindle 3, preferably measured by the temperature sensor 11, is plotted against the time t. At c) a time derivative DT of the measured spindle temperature shown at b) is plotted against the time t.

At a second point in time $t_2$, a pickup signal is produced, the pickup signal being a probe fetch request signal requesting that the geometrical probe 5 may be mounted into the spindle 3 in exchange of the machining tool mounted into the spindle 3 during the machining operation. On this probe fetch request signal, the spindle 3 stops rotating, and the machining tool is released from the spindle 3, such that the spindle 3 is empty, which means that no tool is mounted into the spindle 3. Further, the machine tool 1 is brought into a probe fetch waiting state, in which the at least one temperature parameter is determined, and the probe-fetching time is determined depending on the at least one temperature parameter.

According to a specific embodiment of the method, a start temperature value of the spindle 3 is measured at the second point in time $t_2$, and a waiting time interval $\Delta t_w$ is determined depending on the start temperature value, the waiting time interval $\Delta t_w$ being a time for the machine tool 1 to wait prior to fetching the geometrical probe 5. Preferably, a signal to fetch the geometrical probe 5, i.e. a probe-fetching signal, is produced at a third point in time $t_3$. The geometrical probe 5 is fetched at the third point in time $t_3$.

According to another embodiment of the invention, a temporal sequence of temperature values of the spindle 3 is measured, and the probe fetch signal is produced when the temperature values remain constant within a predetermined relative temperature range for a predetermined time interval.

According to an embodiment of the invention, which is explained in more detail with reference to FIG. 3b), a temporal sequence of temperature values of the spindle 3 is measured, and the probe fetch signal is produced when the temperature values reach or fall below a predetermined probe fetch temperature limit T1, which is the case here at the third point in time $t_3$.

According to another embodiment of the invention, a temporal sequence of temperature values of the spindle 3 is measured, and the probe fetch signal is produced when the time derivative DT of the temporal sequence of temperature values reaches or rises above a predetermined probe fetch derivative limit DT1, which preferably is close to 0, and negative, because the time derivative of the temperature values is negative during cool-down of the spindle 3. This embodiment is further detailed in FIG. 3c), wherein the time, when the time derivative DT reaches or rises above the predetermined probe fetch derivative limit DT1 is again the third point in time $t_3$, which insofar is the probe-fetching time.

In particular the embodiments of the method as detailed in FIGS. 3b) and c) guarantee that a thermal equilibrium for the spindle 3 is reached prior to fetching the geometrical probe 5.

However, if none of the above-detailed conditions apply, after a predetermined maximum waiting time not shown here, the probe fetch signal is nevertheless produced. The predetermined maximum waiting time is preferably chosen such that there is a high probability for a temperature measurement error or some defect in the temperature measurement or evaluation of the temperature values such that the thermal state of the spindle 3 may be not determined. In this case, producing the probe fetch signal after the predetermined maximum waiting time avoids an overlong nonproductive downtime of the machine tool 1 in such a case.

However, when the probe fetch signal is produced after the predetermined maximum waiting time has elapsed, and in particular because the predetermined maximum waiting time has elapsed, a warning signal is output to a user of the machine tool 1, indicating that there is a problem with temperature measurement and determination of the thermal state of the spindle 3, and that there is a risk that the following measurements with the geometrical probe 5 might suffer from a not well-defined thermal state of the spindle 3.

Preferably, a temperature model of the spindle 3 is used to determine at least one of the waiting time interval $\Delta t_w$ the predetermined relative temperature range, the predetermined time interval, the predetermined probe fetch temperature limit T1, and/or the predetermined probe fetch derivative limit DT1.

The time for fetching the geometrical probe 5 is preferably determined depending additionally on at least one preset machine user parameter. The at least one machine user parameter is preferably selected from a group consisting of a preset machining accuracy, a preset machining speed, and a preset surface quality of a surface of a workpiece to be reached by machining the surface of the workpiece with the machine tool.

Preferably, at least one fetching time parameter is determined depending on the at least one machine user parameter, the at least one fetching time parameter being selected from a group consisting of a variable time and/or a variable temperature threshold, a variable delay, the waiting time interval $\Delta t_w$ the predetermined relative temperature range, the predetermined time interval, the predetermined probe fetch temperature limit T1, the predetermined probe fetch derivative limit DT1, the predetermined maximum waiting time, and the predetermined probe waiting time. The time for fetching the geometrical probe is then preferably determined by the at least one fetching time parameter. In particular, the time for fetching the geometrical probe may automatically result from or be identical with the at least one fetching time parameter.

The method as set forth herein may be combined with other methods to determine the probe-fetching time for a geometrical probe 5, in particular with calibration of the geometrical probe 5. In this case, the temperature of the assembly of the spindle 3 and the geometrical probe 5 at their thermal equilibrium can be determined, and data for compensation of this temperature can be used for evaluation of the position measurements carried out with the geometrical probe 5.

It is also possible that the geometrical probe 5 itself comprises at least one temperature sensor, such that also a temperature value for the geometrical probe 5 may be observed.

Also, a method for determining a spindle temperature as detailed in EP 1 688 215 A1 may be combined with the method set forth herein in order to refine the accuracy of the probe-fetching time at which fetching of the geometrical probe 5 may be safely performed. A temperature model as detailed in EP 1 688 215 A1 is able to predict the temperature of the spindle 3 effectively.

The method and the machine tool 1 suggested here allow for reduction of a waiting time before picking up a geometrical probe in order to ensure accurate part measurement without requiring a use of time consuming calibration procedures, nor extra/dedicated hardware, nor explicit thermal modelling. The approach as set forth above is simple, effective and applies to all directions of the machine tool 1.

What is claimed is:

1. A method for using a geometrical probe with a spindle of a machine tool, comprising wherein
   in a probe fetch waiting state of the machine tool, at least one temperature parameter related to a temperature of the spindle of the machine tool is determined by measuring at least one temperature value for the spindle, and
   a time for fetching the geometrical probe is determined depending on the at least one temperature parameter.

2. The method according to claim 1, wherein the at least one temperature parameter is chosen from a group including the at least one temperature value, and a time derivative of a measured spindle temperature.

3. The method according to claim 1, wherein from the at least temperature value a start temperature value for the spindle is measured, and a waiting time interval ($\Delta t_w$) for the machine tool to wait prior to fetching the geometrical probe is determined depending on the start temperature value.

4. The method according to claim 1, wherein a temporal sequence of temperature values (T) of the spindle is measured, and a signal to fetch the geometrical probe is produced when at least one of the following occurs
   a) when the temperature values (T) remain constant within a predetermined relative temperature range for a predetermined time interval,
   b) when the temperature values (T) reach or fall below a predetermined probe fetch temperature limit (T1),
   c) when a time derivative (DT) of the temporal sequence of temperature values (T) reaches or rises above a predetermined probe fetch derivative limit (DT1), and
   d) if none of the conditions a) through c) applies, after a predetermined maximum waiting time.

5. The method according to claim 1, wherein, if the signal to fetch the geometrical probe is produced after a predetermined maximum waiting time has elapsed, a warning signal is produced.

6. The method according to claim 1, wherein a temperature model of the spindle is used to determine at least one of a waiting time interval ($\Delta t_w$), a predetermined relative temperature range, a predetermined time interval, a predetermined probe fetch temperature limit (T1), and/or a predetermined probe fetch derivative limit (DT1).

7. The method according to claim 1, wherein, on a pickup signal to change or pick up a tool, it is checked whether the pickup signal is a probe fetch request signal, and further, if the pickup signal is a probe fetch request signal, the machine tool is brought into the probe fetch waiting state.

8. The method according to claim 1, wherein a spindle temperature adjustment tool is mounted to the spindle in the probe fetch waiting state, the spindle temperature adjustment tool preferably being at least one of a passive cooling tool and an active temperature adjustment tool.

9. The method according to claim 1, wherein the geometrical probe is fetched on a signal to fetch the geometrical probe, and a predetermined probe waiting time is waited from the fetching of the geometrical probe to a first usage of the geometrical probe.

10. The method according to claim 1, wherein
    a) the machine tool is a milling machine, and/or
    b) the geometrical probe is a touch probe.

11. The method according to claim 1, wherein the time for fetching the geometrical probe is determined depending additionally on at least one preset machine user parameter.

12. The method according to claim 11, wherein the at least one machine user parameter is selected from a group consisting of a preset machining accuracy, a preset machining speed, and a preset surface quality of a surface of a workpiece to be reached by machining the surface of the workpiece with the machine tool.

13. The method according to claim 11, wherein at least one fetching time parameter is determined depending on the at least one machine user parameter, the at least one fetching time parameter being selected from a group consisting of a variable time and/or a variable temperature threshold, a variable delay, the waiting time interval ($\Delta t_w$), the predetermined relative temperature range, the predetermined time interval, the predetermined probe fetch temperature limit (T1), the predetermined probe fetch derivative limit (DT1), the predetermined maximum waiting time, and the predetermined probe waiting time.

14. A machine tool having a spindle, a geometrical probe adapted to be coupled to the spindle, at least one temperature sensor arranged and configured to measure a spindle temperature value, and a control device, the control device configured to carry out a method according to claim 1.

* * * * *